(12) United States Patent
Djokovic et al.

(10) Patent No.: US 11,582,481 B2
(45) Date of Patent: Feb. 14, 2023

(54) ENCODING AND DECODING IMAGE DATA

(71) Applicant: iSize Limited, London (GB)

(72) Inventors: Djordje Djokovic, London (GB);
Ioannis Andreopoulos, London (GB);
Ilya Fadeev, London (GB); Srdjan Grce, London (GB)

(73) Assignee: ISIZE LIMITED, London (GB)

( * ) Notice: Subject to any disclaimer, the term of this patent is extended or adjusted under 35 U.S.C. 154(b) by 0 days.

(21) Appl. No.: 17/039,643

(22) Filed: Sep. 30, 2020

(65) Prior Publication Data

US 2021/0021866 A1   Jan. 21, 2021

Related U.S. Application Data

(63) Continuation of application No. PCT/GB2019/051315, filed on May 14, 2019.

(60) Provisional application No. 62/682,980, filed on Jun. 10, 2018, provisional application No. 62/672,286, filed on May 16, 2018.

(51) Int. Cl.
| | |
|---|---|
| *H04N 19/59* | (2014.01) |
| *H04N 19/80* | (2014.01) |
| *H04N 19/85* | (2014.01) |
| *G06N 3/04* | (2006.01) |
| *G06N 3/08* | (2006.01) |

(52) U.S. Cl.
CPC .............. *H04N 19/59* (2014.11); *G06N 3/04* (2013.01); *G06N 3/08* (2013.01); *H04N 19/80* (2014.11); *H04N 19/85* (2014.11)

(58) Field of Classification Search
CPC ........ H04N 19/59; H04N 19/80; H04N 19/85; H04N 19/117; H04N 19/147; H04N 19/192; H04N 19/587; G06N 3/04; G06N 3/08; G06N 3/0445; G06N 3/049; G06N 3/0454; G06N 3/082
See application file for complete search history.

(56) References Cited

U.S. PATENT DOCUMENTS

| | | | |
|---|---|---|---|
| 9,936,208 B1 | 4/2018 | Brailovskiy et al. | |
| 2008/0232452 A1* | 9/2008 | Sullivan ............. | H03H 17/0294 375/232 |
| 2018/0139458 A1* | 5/2018 | Wang ..................... | H04N 19/85 |
| 2019/0294413 A1* | 9/2019 | Vantrease ............. | G06F 17/153 |
| 2020/0389658 A1* | 12/2020 | Kim ..................... | H04N 19/132 |

OTHER PUBLICATIONS

International Search Report and Written Opinion for PCT Application No. PCT/GB2019/051315, dated Nov. 21, 2019, 14 pages.

(Continued)

*Primary Examiner* — Nasim N Nirjhar
(74) *Attorney, Agent, or Firm* — Dinsmore & Shohl LLP

(57) ABSTRACT

Certain aspects of the present disclosure provide techniques for encoding image data for one or more images. In one embodiment, a method includes the steps of downscaling the one or more images, and encoding the one or more downscaled images using an image codec. Another embodiment concerns a computer-implemented method of decoding encoded image data, and a computer-implemented method of encoding and decoding image data.

16 Claims, 16 Drawing Sheets

(56) References Cited

OTHER PUBLICATIONS

Sevcenco et al., "Adaptive Down-Scaling Techniques for JPEG-Based Low Bit-Rate Image Coding", 2006 IEEE International Symposium on Signal Processing and Information Technology, IEEE, PI, Aug. 1, 2006 (Aug. 1, 2006), 6 pages.

Dar et al., "Improving Low Bit-Rate Video Coding using Spatio-Temporal Down-Scaling", Apr. 15, 2014 (Apr. 15, 2014), Retrieved from the Internet: URL:https://arxiv.org/pdf/1404.4026.pdf, 27 pages.

* cited by examiner

| Team | PSNR (dB) | Speed (ms/frame) and GPU spec used |
|---|---|---|
| SNU_CVLab1 | 34.93 | GTX TITAN X (3075 cores, 1.00 GHz) 67,240 |
| SNU_CVLab2 | 34.83 | GTX TITAN X (3075 cores, 1.00 GHz) 14,070 |
| Lab402 | 34.66 | GTX1080ti (3584 cores, 1.58 GHz) 4,080 |
| FSRCNN | 34.59 | GTX1070 (1920 cores, 1.51 GHz) 1,650 |
| VICLab | 34.29 | TITAN X Pascal (3840 cores, 1.58 GHz) 593 |
| HIT-ULSee | 34.07 | TITAN X Pascal (3840 cores, 1.58 GHz) 370 |
| POU Upscaler | 33.89 | GTX1070 (1920 cores, 1.51 GHz) 11.1 |
| Lanczos4 - OpenCV | 31.61 | CPU implementation 28.5 |
| Bicubic - OpenCV | 31.27 | GTX1070 (1920 cores, 1.51 GHz) 6.8 |

Fig. 13

| Resolution | SD→HD (mostly 960×540 → 1920×1080) | | | HD→4K (2048×1080 → 4096×2160) | | |
| --- | --- | --- | --- | --- | --- | --- |
| Method | PSNR (dB) | % MSE reduction | Time per frame (ms) | PSNR (dB) | % MSE reduction | Time per frame (ms) |
| OpenCV bicubic | 36.06 | 0 | 1.6 | 43.05 | 0 | 5.6 |
| OpenCV/FFMPEG Lanczos (CPU) | 35.90 | -3.84 (increase) | 5.8 | 42.91 | -3.38 (increase) | 22.7 |
| SNU_CVlab2 NTIRE2017 winner | 36.50 | 9.67 | 12,050 | 43.51 | 13.81 | 48,980 |
| FSRCNN CVPR2016, highly cited | 37.58 | 29.51 | 481.5 | 43.74 | 14.58 | 1,419 |
| POU upscaler (GTX 1070) | 37.26 | 24.07 | 3.5 | 44.09 | 21.18 | 9.3 |
| POU upscaler (TX2) | 37.26 | 24.07 | 8.6 | 44.09 | 21.18 | 13.9 |

Fig. 14

ENCODING AND DECODING IMAGE DATA

CROSS-REFERENCE TO RELATED APPLICATIONS

This Application is a continuation of PCT International Application No. PCT/GB2019/051315, filed on May 14, 2019, which claims the benefit of U.S. Provisional Patent Application No. 62/682,980, filed on Jun. 10, 2018, and U.S. Provisional Patent Application No. 62/672,286, filed on May 16, 2018, the entire contents of each of which are incorporated herein by reference.

INTRODUCTION

Field of the Invention

The present invention concerns computer-implemented methods of encoding image data, and of decoding encoded image data. The present invention also concerns computer-implemented methods of optimizing neural networks. The invention is particularly, but not exclusively, applicable where the image data is video data.

BACKGROUND OF THE INVENTION

Over the last three decades, advances in image and video coding algorithms have led to ever improving compression rates. Nevertheless, with video in particular projected to occupy more than 80% of all IP traffic by 2021, bitrate saving continues to be required, as improvements in network capacity are quickly overcome by increasing demand for content.

Various video coding standards are available, with new codec generations generally aiming at 30-50% increase in compression efficiency, at the expense of increasing complexity. The latter aspect means that new standards are adopted very slowly: for instance, MPEG HEVC was standardized in 2013, but its high licensing fees and complexity (especially for HD and 4K content) have meant is has not yet been widely adopted.

The present invention seeks to solve or mitigate some or all of these above-mentioned problems. Alternatively and/or additionally, aspects of the invention seek to provide improved image and video encoding and decoding methods, and in particular methods that can be used in combination with existing image and video codec frameworks.

In addition, both in image and video processing and in other domains such as face recognition and ethnicity/gender recognition, to give just two examples, artificial neural networks, particularly deep neural networks (DNNs), can be effectively used. However, system-level resource-precision scalability is still at a nascent stage for DNNs. Particularly given the use of DNNs in different environments, such as embedded processors to custom hardware and virtual machines in the cloud, the complexity of training, fine-tuning and testing of new or existing DNN designs for each such system and application deployment can be problematic. This is particularly the case in the context of image or video frame (IoVF) super resolution (SR) algorithms, which aim at recovering high resolution (HR) IoVFs from a given low resolution (LR) IoVF stream. State-of-the-art SR algorithms comprise DNN-based approaches that map LR IoVFs to their equivalent HR spaces [16]-[18]. In particular, convolutional neural networks (CNNs) have been the most widely adopted approach in SR problems due to their simple network structure and excellent restoration quality [16]-[18].

However, the deployment of real time upscaling for larger resolutions (HD and 4K) on consumer grade hardware remains the biggest hurdle for adoption as currently only professional grade GPUs can handle the memory and performance requirements. The main reason is that the complexity of SR CNNs grows quadratically with the spatial dimension of the HR IoVFs [18]. More recently, linear growth of complexity has been achieved by learning directly from LR IoVFs and further speed improvements have been achieved by reducing network depth and complexity and effectively trading off speed for quality [19]-[21]. In addition, pruning of DNNs and compression techniques have been proposed as the means for efficient DNN realizations in custom hardware [23]-[25].

Current research in DNN implementations can be broadly grouped in the following categories:

Hardware-based approaches, e.g., mixed-signal circuit design for the execution of multiply-accumulate (MAC) operations [31], implementing the entire convolution layer (including cony, max-pooling, and soft-max in the analogue domain or via spiking neural network architectures) [32], spatial architectures to bring memory elements closer to the actual computation [33][34], and GPU customization for deep learning libraries, such as NVIDIA®'s DGX product line, TPUs, and ARM® NPUs [38].

Programmable approaches, whereby: compiler optimizations are used to accelerate the offloading of computations to the available CPUs and GPUs [35]; FFTs are used to reduce the realization cost of large convolutions after unrolling a number of filtering operations into a large array [36]; grouping of convolutions into a smaller number of cony or generic matrix-multiply calls with very large dimensions, such that high-performance libraries like Intel MKL, cuBLAS, cuDNN, or Eigen can achieve above-70% of the peak-performance of a utilized computing cluster.

Algorithmic acceleration, where library components are customized in order to detect sparsity in the inputs and exploit it to avoid unnecessary filtering operations [37], software-based compression techniques are used to reduce the overhead of large data transfers between off-chip memories (e.g., when reading new batches of data) [39][40], and approximations of the inputs to fixed-point, integer or binary computations are performed in order to reduce the bitwidth of computations [23]-[25][41].

While the hardware and compiler-specific customizations of the first two approaches can be beneficial, they are constrained to the specific platform they are targeted on [29]-[35]. The third approach requires customization of library components, which can be inflexible and often unable to achieve effective results.

The present invention also seeks to solve or mitigate some or all of these above-mentioned problems. Alternatively and/or additionally, other aspects of the invention seek to provide improved methods of optimizing artificial neural networks.

BRIEF SUMMARY

In accordance with a first aspect of the invention there is provided a computer-implemented method of encoding image data for one or more images using an image codec, wherein the image codec comprises a downscaling process, the method comprising the steps of: downscaling the one or more images in accordance with an initial downscaling process; and subsequently encoding the one or more downscaled images using the image codec.

Downscaling an image refers to reducing the number of pixels it contains, so for example a 16×16 square pixels may be reduced to a 2×2 square. Downscaling may be done using the same ratios in horizontal and vertical directions, or different ratios may be used in different direction (or one direction may not be downscaled at all). Where a plurality of images is downscaled, in particular where the images are consecutive frames of video, temporal downscaling may also be used.

By downscaling the image prior to using the image codec, no change of image codec is required, and so existing image codecs can be used. Further, as the images are only downscaled, following transmission of encoded image data, the process can be reserved following decoding of the encoded images by the image codec, by merely upscaling the images to reverse the downscaling, without any additional information needing to be added to the transmitted image data (e.g. a "refinement layer") to enable this. (However, such additional information can be added and used if desired.) This is because the initial downscaling process can be designed to be in accordance with downscaling performed by the image codec itself, so that the downscaled images can be encoded by the image codec without essential information being lost. This means that after they are subsequently decoded by the image codec, the decoded downscaled images can be upscaled by simply reversing the initial downscaling process, to recover the required decoded and upscaled images of the required size/resolution etc.

Thus, the fidelity of the one or more images can be maximized when the one or more images are upscaled by the decoder and player of the image codec, without any additional information beyond the downscaled one or more images, or an approximation the downscaled one or more images.

In addition, the parameters used when downscaling can be chosen to provide different desired results, for example to improve accuracy (i.e. how similarly the recovered images are to the original), or alternatively to improve the speed/efficiency of the image codec (i.e. by providing downscaled images the mage codec is more easily able to process), or anywhere in the range between the two.

Preferably, the one or more images are downscaled using one or more filters. A filter of the one or more filters is an edge-detection filter. Alternatively and/or additionally, a filter of the one or more filters is a blur filter. The blur filter may be a Gaussian blur filter, for example.

Advantageously, the parameters of a filter used to downscale an image are determined using the results of the encoding of previous images by the image codec. In particular, the amount of downscaling, either horizontally or vertically or over time, may be determined from the results. Where the image codec is not performing well, for example, the parameters can be adjusted so that more downscaling is performed, to help the image codec.

Advantageously, the images are downscaled using an artificial neural network.

Advantageously, the neural network comprises a plurality of layers of neurons, the method comprises iterating, until a stopping condition is reached, the steps of: determining an importance value for a set of neurons or layers of neurons; removing the neurons and/or layers with importance value less than a determined amount from the neural network; and tuning the neural network in accordance with a cost function, wherein the cost function is arranged to determine a predetermined balance between the accuracy of the downscaling performed by neural network and the complexity of the neural network. By removing layers with low importance, the complexity of the neural network can be reduced, but its accuracy maintained by the subsequent tuning. The tuning may be the usual back propagation used to tune the neural network.

The importance value of a neuron may for example be the weight of the neuron. The importance value of a layer may for example be the sum of absolute weights of neurons of the layer. Many of other metrics to determine the importance value will be apparent to the skilled person.

The neural network may also comprise filters, for which importance values are also determined and which may result in them being removed. A set of neurons/layers may be all neurons/layers, or only a subset.

In the removal step, the layer with lowest importance value may be removed. Alternatively, all neurons, layers and/or filters with importance value less than a threshold may be removed. Many of other methods for determining the layers and/or filters to remove based on their importance values will be apparent to the skilled person.

The stopping condition may that the iterated steps have been performed a predetermined number of times. The predetermined number, to give just one of various possibilities, may be 100. Alternatively, various other stopping conditions may be used, for example iteration may be stopped when no importance values are below a threshold.

Preferably, the method further comprises, following the iterated steps, the steps of applying a monotonic scaling function to the weighting of the neurons of the neural network; and tuning the neural network. In this case, the iterated steps and the applying and tuning steps may be iterated until a further stopping condition. The further stopping condition may again be number of iterations, or some other appropriate condition.

Advantageously, the step of downscaling the one or more images comprises the step of determining the processes to use to downscale an image using the results of the encoding of previous images by the image codec. In other words, the filters and/or neural network will be selected to be used, or selected not to be used, based on the previous results. As with determining the parameters from previous results, where the image codec is not performing well, for example, the filters/neural network to use can be selected so as provide the image codec with the help it requires.

The encoded image data may comprise data indicative of the downscaling performed. This is often known as a refinement layer. This data can then be used to aid the corresponding upscaling process. Such data may be added to the downscaled images prior to encoding by image codec, or may be added after to the encoded image data after it has been encoded by the image codec.

However, more advantageously the encoded image data does not comprise any such data, and the upscaling is performed purely based on the downscaled images.

The image codec may be lossy. In other words, the image codec may discard some information when compressing the images, so that recreation of the exact images that were encoded is not possible. Alternatively, the image codec may be lossless.

In accordance with a second aspect of the invention there is provided a computer-implemented method of decoding encoded image data for one or more images, wherein the encoded image data was encoded using the any of the methods described above, the method comprising the steps of: decoding the encoded image data using the image codec to generate one or more downscaled images; upscaling the one or more images.

As discussed above, as the images have been downscaled prior to encoding by the image codec, they can be upscaled following decoding without any further information being required beyond the decoded downscaled images themselves.

If the image codec used is lossy, the one or more generated images will of course be approximations only of original the original downscaled images. Nevertheless, the generated images can be upscaled to reproduce approximations of the original images, which are of better quality and/or allow better performance of the image codec than if the downscaling and upscaling was not performed.

If the image codec used is not lossy, the one or more generated images may again be approximations or may be identical to original images, depending on downscaling performed.

If the encoded image data comprises data indicative of the downscaling performed, and the data indicative of the downscaling performed may be used when upscaling the one or more images.

In the above first and second aspects of the invention, the image data may be video data, the one or more images frames of video, and the image codec a video codec.

The methods of encoding and decoding may be performed on a batch of video data, e.g. a complete video file for a movie or the like, or on a stream of video data.

In accordance with a third aspect of the invention there is provided a computer-implemented method of encoding and decoding image data for one or more images, comprising the steps if: encoding the image data using any of the methods described above to provide encoded image data; transmitting the encoded image data; and decoding the encoded image data using any of the methods described above.

In accordance with a fourth aspect of the invention there is provided a computing device comprising: a processor; memory; wherein the computing device is arranged to perform using the processor any of the methods of encoding image data or decoding encoded image data described above on image data or encoded image data stored in the memory.

In accordance with a fifth aspect of the invention there is provided a computer program product arranged, when executed on a computing device comprising a process or memory, to perform any of the method of encoding image data or decoding encoded image data described above.

In accordance with a sixth aspect of the invention there is provided a computer-implemented method of optimizing an artificial neural network for performing a task, wherein the neural network comprises a plurality of layers of neurons, the method comprising iterating, until a stopping condition is reached, the steps of: determining an importance value for a set of neurons or layers of neurons; removing the neurons and/or layers with importance value less than a determined amount from the neural network; and tuning the neural network in accordance with a cost function, wherein the cost function is arranged to determine a predetermined balance between the accuracy of the task performed by neural network and the complexity of the neural network.

By removing layers with low importance, the complexity of the neural network can be reduced (e.g. its number of neurons, layers, operations or the like as appropriate), but its accuracy maintained by the subsequent tuning as desired (i.e. as defined by the predetermined balance of the cost function). The tuning may be the usual back propagation used to tune the neural network. By focusing on the way the layers of the neural network are designed and formed, the method can be performed using well-known libraries, during both training and testing.

Advantageously, the optimization of the method can focus on precision or acceleration or a combination, so ranging from full precision at no acceleration, to approximate training and/or inference with high acceleration (e.g. more than 100-fold), for example. This can be controlled by tuning the parameters of the utilized approach and allowing for simplified controls of these parameters to be exposed as hyperparameters, so that tuned resource-precision characteristics of the neural network can be tuned using well-known hyperparameter tuning methods [27][28] that account for the specifics of the data and the utilized DNN.

The importance value of a neuron may for example be the weight of the neuron. The importance value of a layer may for example be the sum of absolute weights of neurons of the layer. Many of other metrics to determine the importance value will be apparent to the skilled person.

The neural network may also comprise filters, for which importance values are also determined and which may result in them being removed. A set of neurons/layers may be all neurons/layers, or only a subset.

In the removal step, the layer with lowest importance value may be removed. Alternatively, all neurons, layers and/or filters with importance value less than a threshold may be removed. Many of other methods for determining the layers and/or filters to remove based on their importance values will be apparent to the skilled person.

The stopping condition may that the iterated steps have been performed a predetermined number of times. The predetermined number, to give just one of various possibilities, may be 100. Alternatively, various other stopping conditions may be used, for example iteration may be stopped when no importance values are below a threshold.

Preferably, the method further comprises, following the iterated steps, the steps of applying a monotonic scaling function to the weighting of the neurons of the neural network; and tuning the neural network in accordance with the cost function. In this case, the iterated steps and the applying and tuning steps may be iterated until a further stopping condition. The further stopping condition may again be number of iterations, or some other appropriate condition.

In accordance with a seventh aspect of the invention there is provided a computing device comprising: a processor; memory; wherein the computing device is arranged to perform, using the processor, any of the methods of optimizing an artificial neural network described above on an artificial neural network stored in the memory.

In accordance with an eighth aspect of the invention there is provided a computer program product arranged, when executed on a computing device comprising a process or memory, to perform any of the methods of optimizing an artificial neural network described above.

It will of course be appreciated that features described in relation to one aspect of the present invention described above may be incorporated into other aspects of the present invention.

BRIEF DESCRIPTION OF THE DRAWINGS

Embodiments of the present invention will now be described by way of example only with reference to the accompanying schematic drawings of which:

FIGS. 12 to 14 show comparison results for neural networks optimized by methods in accordance with embodiments of the invention, and known neural networks;

DETAILED DESCRIPTION

Embodiments of the invention are now described.

Figure 1:
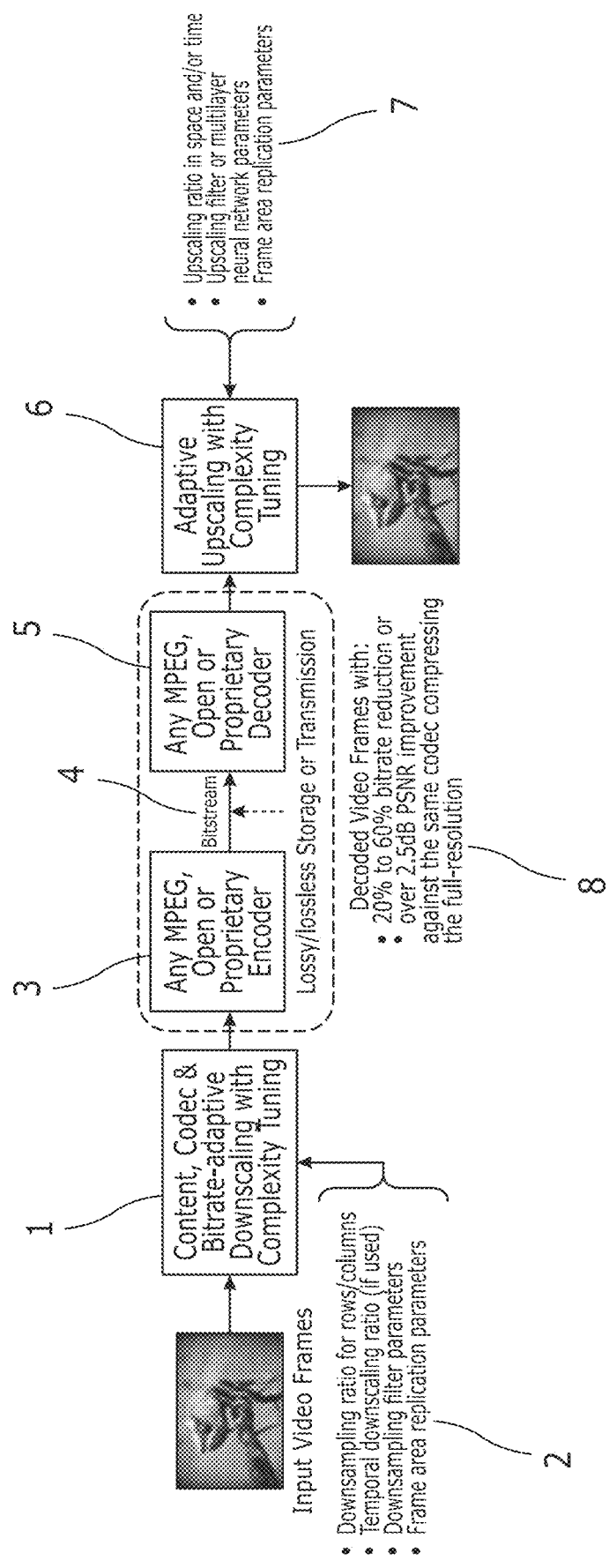
FIG. 1 is a schematic diagram of a method of encoding and decoding image data in accordance with an embodiment of the invention.

FIG. 1 is a schematic diagram showing at a high level the steps of an embodiment of the invention, in which video data is encoded and decoded. The embodiment is applicable to batch processing, i.e. processing a group of images or video frames together without delay constraints (e.g. an entire video sequence), as well as to stream processing, i.e. processing only a limited subset of a stream of images or video frames, or even a select subset of a single image, due to delay or buffering constraints.

In the first downscaling stage 1 of FIG. 1, the input image(s) or video frames (IoVF) are filtered and downscaled in space and/or time (Sa/oT) with one, or combination of, the options described below.

Option 1: One or more content-adaptive filters are applied to the IoVF. The content-adaptive filters track edge direction within one or more IoVFs, or flow of pixel or scene activity in time between two or more successive IoVFs, and downscale in Sa/oT by any rational factor $$\frac{a}{b}$$

with a, b any integers greater than zero such that b≥a. The integers a, b are chosen adaptively (i.e. based on the content of the IoVF, which may include the results of the overall process on previous IoVF) in each Sa/oT dimension using the adaptivity mechanisms 2 of FIG. 1, as described in more detail below.

Option 2: An Sa/oT blur filter kernel is applied to the IoVF. The Sa/oT filter may be, but is not limited to, an Sa/oT Gaussian function followed by downscaling as in option 1 above.

Option 3: An autoencoder is applied to the IoVF. The autoencoder comprises a series of layers such as (but not limited to) those shown in FIG. 2, followed by non-linearities (such as, but not limited to, operations: finding the maximum within groups of inputs; comparing inputs to thresholds and producing 0 or 1 according to the result; pooling of multiple values together with other non-linear operations like value rounding to an integer or multivalue assignment with a static or dynamic non-linear function). The autoencoder is designed as a multilayered neural network as discussed in references [10]-[12], trained with offline content & back propagation. The training may for example use, but is not limited to, stochastic gradient descent methods [10], performing downscaling in Sa/oT as per said option 1 above, and minimizing a specific cost function that includes one or both of the following: (I) a distance metric when upscaling with the corresponding autoencoder structure (e.g., mean square error or other); (II) a structural similarity metric between the high-resolution and the Sa/oT-downscaled IoVF (e.g., counting successive peaks in the signal and their signs or comparing the phase of the two signals when computed with a phase-generation transform).

Figure 5:
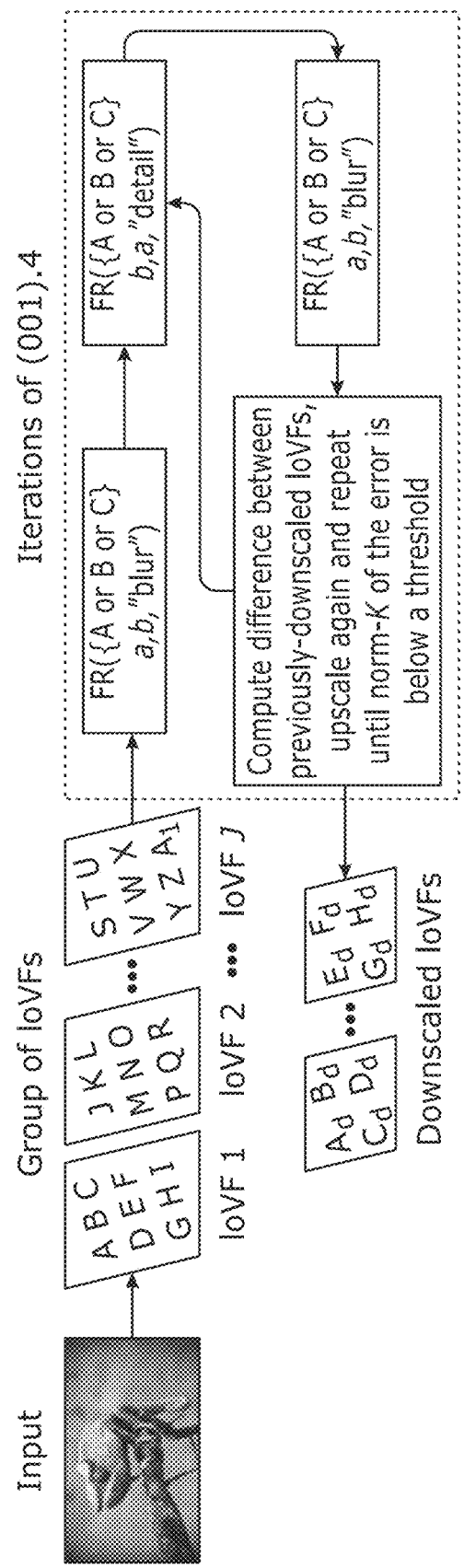
FIG. 5 is a schematic diagram of an iteration process of the method of FIG. 1.
Figure 6:
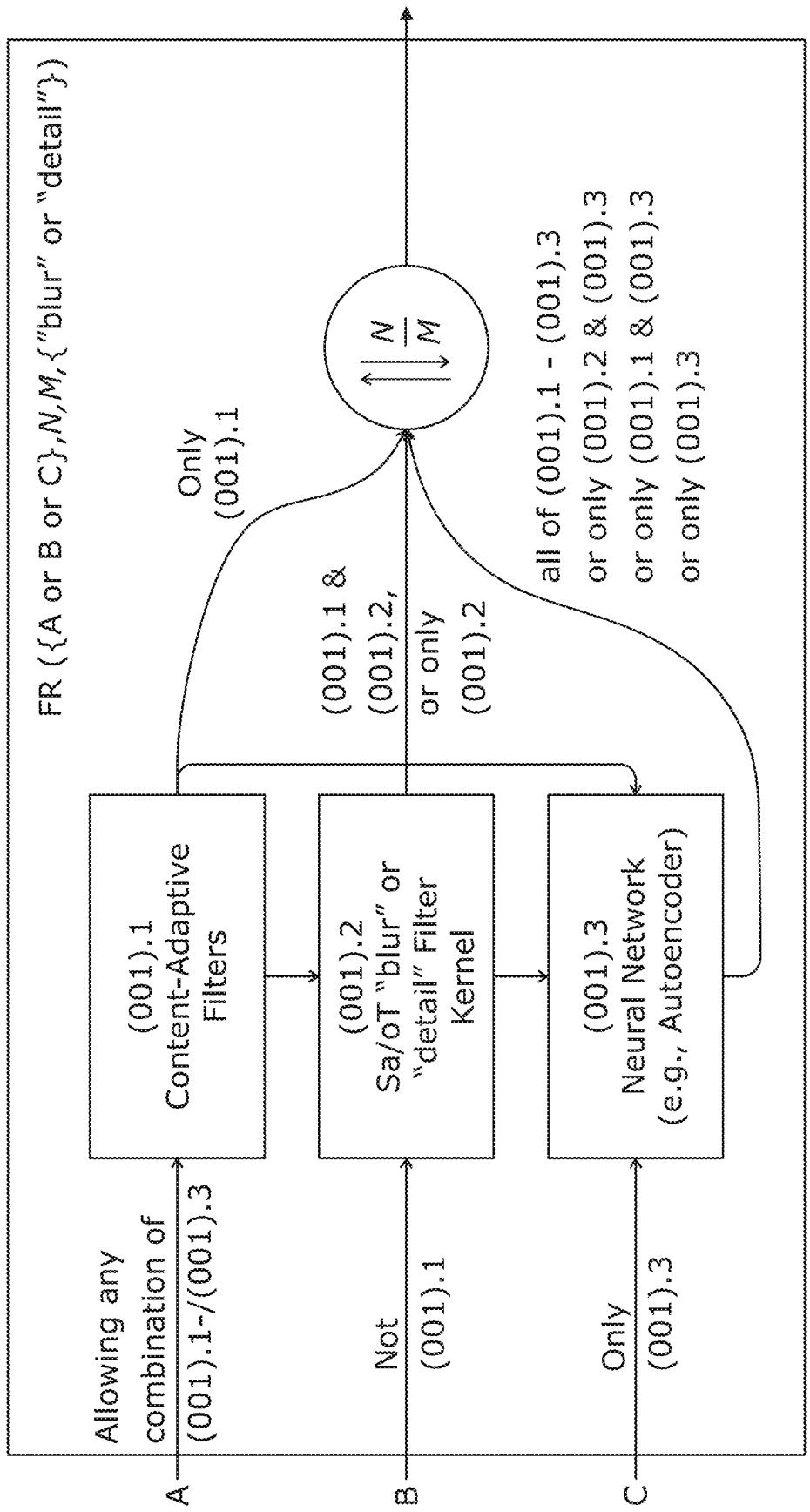
FIG. 6 is a schematic diagram of the FR function of the iteration process of FIG. 5.

In certain embodiments, the application of the options 1 to 3 may be iterated within a loop, as now described with reference to FIGS. 5 and 6. FIG. 5 shows the process of the downscaling stage 1, in particular possible interactions between the different options, while FIG. 6 shows in more detail the operation FR shown in FIG. 5. In FIGS. 5 and 6 the options 1 to 3 are identified as (001).1 to (001).3, while the iteration loop of all the options is identified as (001).4.

The steps of the iteration process are as follows:

(I) The downscaled IoVFs by any factor $$\frac{a}{b}$$

in Sa/oT as per option 1 are upscaled back to their original Sa/oT resolution using an edge-adaptive or autoencoding-based upscaling (designed to approximately invert the downscaling process), and a filter kernel is applied, such as (but not limited to) a fixed or adaptive filter having complementary frequency response to the Sa/oT blur kernel of option 2 (i.e., being an Sa/oT high-frequency—or "detail"—enhancement kernel rather than an Sa/oT blur kernel).

(II) The upscaled IoVFs are downscaled with any of the downscaling processes of options 1-3, and the downscaled error IoVF computed as the difference between the previously-downscaled IoVF and the downscaling of this part.

(III) The downscaled error IoVF is upscaled following any of the options 1-3, and filtered with the filter kernel of step I above in order to be added to the previously-upscaled IoVF of step I above.

(IV) Steps II and III above are repeated until norm-K (also known as $L_K$) [15] of the downscaled error IoVFs does not change beyond a threshold between successive iterations, or for a fixed number of iterations (e.g., 3 iterations, or any other number).

In embodiments of the invention, the filters of option 1 may include (but are not limited to) edge-adaptive filters that use thresholding to determine edge content in input IoVF or IoVF difference matrices, e.g., local or global thresholding. An example embodiment of such edge-adaptive filters is, but is not limited to, adaptive weighted combinations of adjacent samples from IoVFs in Sa/oT, e.g., for samples A, B, D, E, J, K, M, N of the successive IoVFs 1 & 2 of FIG. 5, the space-time combination:

$$R_d = T_{t_1}(w_1 A) + T_{t_2}(w_2 B) + T_{t_3}(w_3 D) + T_{t_4}(w_4 E) + T_{t_5}(w_5 J) + T_{t_6}(w_6 K) + T_{t_7}(w_7 M) + T_{t_8}(w_8 N)$$

with:

$$\forall i \in \{1, \ldots, 8\}: T_{t_i}(x) = \{x, \text{if } x > t_i; 0, \text{otherwise}\}$$

where $\forall i \in \{1, \ldots, 8\}$: $t_i$, $w_i$ are thresholds and weights set adaptively in order to align the filtering of the equation $R_d$ to Sa/oT edges in the input IoVFs.

In embodiments of the invention, the "blur" filter kernel of option 2 may include (but is not limited to) the 5×5 Gaussian function of the form:

$$G[x,y,t] = [1/(2\pi\sigma^2)]\exp(-(x^2+y^2+t^2)/(2\sigma^2)),$$

with $-2 \leq x, y, t \leq 2$ being the function's discrete space-time support and σ being the standard deviation of the Gaussian function.

Figure 2:
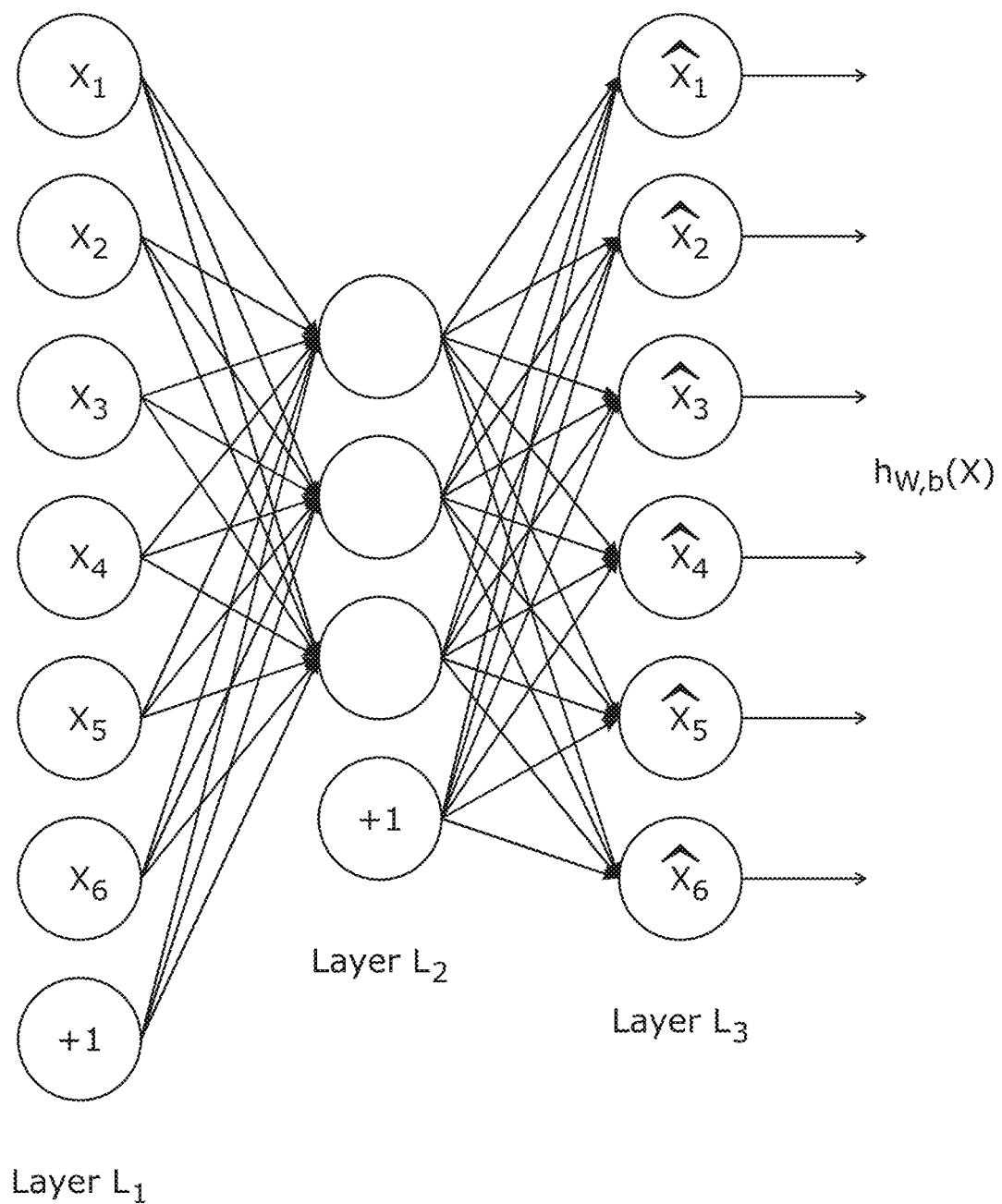
FIG. 2 is a schematic diagram of a layers of an artificial neural network.

In embodiments of the invention, the autoencoder of option 3 may include, but is not limited to, autoencoders that, through a series of layers such as those shown in FIG. 2, minimize a cost function $h_{W_b}$ that includes terms maintaining the distance when upscaling with the autoencoding process and when upscaling with a simpler process such as a bicubic or bilinear filter.

Finally, in embodiments of the invention, option 4 may include, but is not limited to, any embodiments of options 1-3 within the iterative loop described, and computing the norm-1 or norm-2 between the error signal of successive iterations in order to establish if the norm is below a threshold.

The adaptivity mechanisms 2 used in option 1 above are now discussed in more detail. The adaptivity mechanisms 2 comprise one or both of the following two parts:

(i) Adaptive tuning of parameters for the downscaling ratio in Sa/oT between successive IoVF (with the downscaling ratio changing in each Sa/oT dimension, or within the same IoVF) and/or adaptively changing the filter or autoencoding parameters in Sa/oT in order to achieve the best results on training data or based on a modelling framework that approximates the cost functions used. Embodiments of the invention include, but are not limited to, this tuning using larger downscaling ratios for high-bitrate encoding and lower ratios for low-bitrate encoding, since it is expected that downscaling ratio will decrease monotonically to the utilized bitrate for the encoding of the low-resolution IoVFs. For example, for bitrates between 3,500 kbps and 7,000 kbps and HD-resolution video content at 25 to 30 frames-per-second (fps), the tuning of parameters can select: spatial downscaling ratios $$\frac{a}{b} = \frac{3}{4}$$

for both the horizontal and vertical spatial dimension; temporal downscaling ratio $$\frac{a}{b} = 1;$$

the use of the 5×5 blur kernel of eq. 3 and a corresponding 5×5 detail kernel such as a Laplacian of Gaussians with appropriate choice of standard deviation parameters; and three iterations of the iteration process described above.

On the other hand, for bitrates between 100 kbps and 300 kbps, the adaptive tuning can select: spatial downscaling factors $$\frac{a}{b} = \frac{1}{4}$$

for the horizontal dimension;

$$\frac{a}{b} = \frac{1}{2}$$

for the vertical spatial dimension;

$$\frac{a}{b} = \frac{1}{2}$$

for the temporal dimension; the use of a 6-layer autoencoder with the mean square error after reconstruction; and two iterations of the iteration process described above.

The choice of these parameters can be done based on a combination of offline training with representative IoVFs, as well based on online features extracted from the present IoVFs to be encoded, such as variance between frames, the rate-distortion characteristics of select encoding of certain frames with a fast & single-pass with the utilized video codec, etc. These tuning options are just some of the options that will be apparent to the skilled person.

(ii) In order to control the complexity of the entire process, adaptive tuning of whether to apply the three options described above within areas of each IoVF based on a similarity criterion between successive IoVF, e.g., computing areas of the error between IoVF $L_K = f_K(V_i[x,y] - V_{i+1}[x,y])$ with i being the time index, and (x,y) representing an area within the IoVFs and $f_K$ representing a distance function, e.g., norm-K (also known as $L_K$ norm) [15], with $K \in \{0, \ldots, \inf\}$. When similarity is above a certain threshold (with the latter itself tuned adaptively), instead of applying any of the three options, the same downscaled output as in the previous IoVF, or the same parameters as used for the options, are used. For example, blocks of 16×16 can be replicated from the reconstruction of previous frames if their difference at low resolution has norm-2 that is below 0.01. The skilled person will appreciate that this is just one example of a threshold rule, and many other possible distance metrics would be apparent to the skilled person.

In the next encoding stage 3 of FIG. 1, the filtered and downscaled IoVFs are encoded using an image or video codec. Any standard MPEG, ITU-T, Open, proprietary, or machine-learning encoder (e.g., autoencoder or other) may be used to compress the produced downscaled IoVFs to a binary stream. Examples include, but are not limited to: the MPEG-ITU-T AVC/H.264 video codec, the MPEG HEVC codec, the JPEG or JPEG2000 image codec, the AOMedia AV1 video codec, machine learning image codecs such as those proposed in research papers [10]-[14].

In the next transmitting stage 4 of FIG. 1, the binary stream produced by the encoding stage 3 is stored or transmitted (over any network), by a lossy or lossless method. This includes the transmission or storage of subsets or "layers" of the produced bitstream, such as select frames or bitstream corresponding to Sa/oT portions of the entire set of IoVFs and decoding any of these subsets with any standard MPEG, ITU-T, Open, proprietary or machine-learning decoder to decompress the provided bitstream into "received" or "recovered" IoVFs. This stage may include the transmission of additional layers known as "refinement layers", which contain information that can assist in the creation of the full-resolution image/video from the compressed downscaled version, and that is not present within the compressed bitstream of the downscaled version. However, importantly, the transmission/storage and use of said refinement layers is not present in all embodiments of the invention.

In the next decoding stage 5 of FIG. 1, the binary stream from the transmitting stage 4 is decoded, using the corresponding decoder for the image or video codec using in the encoding stage 3.

In the next upscaling stage 5 of FIG. 1, the decoded downscaled IoVFs from the transmitting stage 4 are filtered in Sa/oT with one or a combination of the following options: content-adaptive filters tracking edge direction or flow of pixel or scene activity in time, designed to match (DtM) those of option 1 of the downscaling stage 1, where the definition of "DtM" is one of the following: (i) identical steps are applied, with the only change being alternating signs of addition with subtraction and/or upscaling instead of downscaling; (ii) steps corresponding to those of option 1 of the first stage 1 according to a certain similarity criterion expressed by a closed-form expression (e.g., distance function or other) or optimization process (e.g., dynamic programming process or other convex optimization process that minimizes the error of the upscaled output or the error between the application of the two operators in tandem); an Sa/oT blur (or detail) kernel, such as a Sa/oT Gaussian function DtM that of option 2 the downscaling stage 1; an autoencoder DtM that of option 3 the downscaling stage 1; and/or an iterative process DtM that of the iterative process of the downscaling stage 1.

In this upscaling stage 6, adaptive tuning 7 of parameters for the upscaling ratio in Sa/oT between successive IoVF (with the upscaling ratio changing in each Sa/oT dimension and being any rational number $$\frac{b}{a}$$

with a, b any integers greater man zero), or within the same IoVF and/or adaptively changing the filter or autoencoding parameters in Sa/oT, is performed so as to DtM the parameters used in the downscaling stage 1. This includes the adaptive tuning of whether to apply the DtM steps of the downscaling stage 1, or simply replicate the same content as in the previous IoVF (or the same parameters) are used, as in the adaptivity mechanisms 2.

As noted in the comparison results 8 shown in FIG. 1, obtaining the decoded IoVFs and storing, displaying, or ingesting them into a subsequent machine learning or artificial intelligence system, has been shown to demonstrate a reduction in bitrate or quality increase (e.g., increase in PSNR, SSIM or other visual metric), compared with the same encoding stage 3 and decoding stage 5 but in the absence of some or all of the downscaling stage 1, adaptivity mechanisms 2, upscaling stage 6 and adaptive tuning 7.

Figure 7:
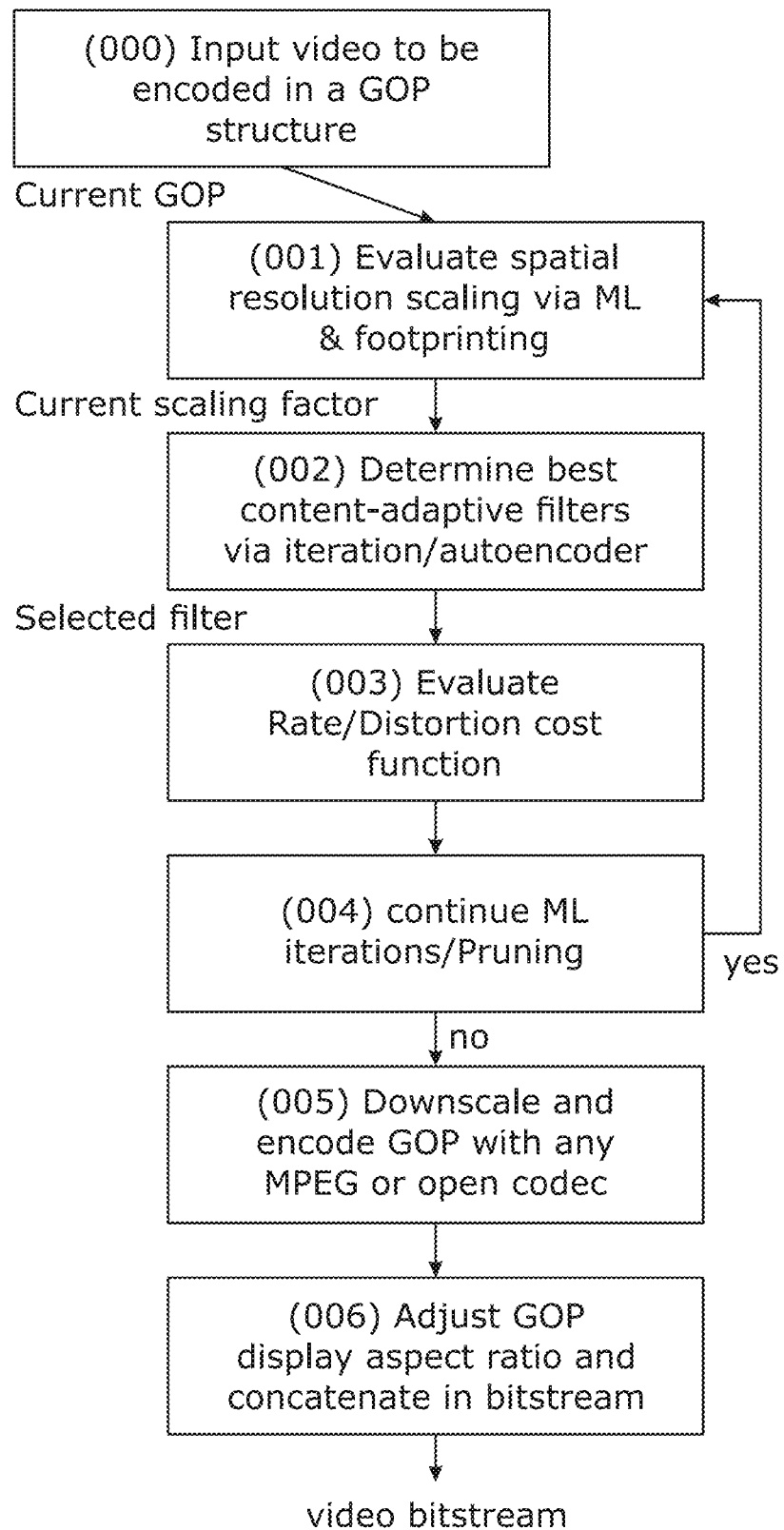
FIG. 7 is a flowchart showing the steps of a method of encoding video data with a GOP structure.
Figure 8:
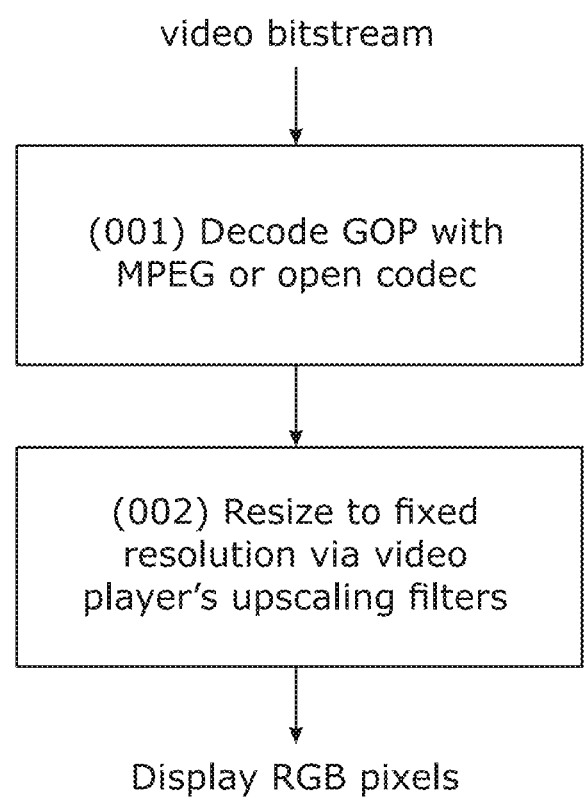
FIG. 8 is a flowchart showing the steps of a method of decoding encoded video data encoded using the method of FIG. 7.

It will be appreciated that where video data has a GOP ("groups of pictures") structure, i.e. it comprises a series of GOPs, the parameters for downscaling a whole GOP could be determined (i.e. the same parameters use to downscale all images in the GOP), as by their nature the images in a GOP are likely to share characteristics. Parameters for subsequent GOPs could then be determined, so that different GOPs are downscaled using different parameters, if appropriate. Each downscaled GOP can then encoded and added to the video bitstream using a known video codec in the usual way. A flowchart showing an example method of encoding such video data is shown in FIG. 7. The video bitstream can then be decoded using the video codec, and each GOP upscaled using the required parameters, and a flowchart showing an example method of decoding such video data is shown in FIG. 8.

A method of optimizing an artificial neural network in accordance with an embodiment of the invention is now described. Such a neural network can for example be used as the autoencoder of option 3 of the downscaling stage 1 of the embodiment described above.

The neural network of the present embodiment is a multi-layered neural network a part of which is shown in FIG. 2, which can also be known as a deep neural network (DNN). (Such DNN may be, but are not limited to, convolutional neural networks.) The method can serve to control the complexity-vs-accuracy of such a DNN. It has been observed that practical DNN designs are underpinned by an enormous reuse trend: there are perhaps 15-20 core architectures trained on massive amounts of data (such as: VGG, Inception, GoogleNet, DRAW, RNN LM, etc.), which are then adapted and repurposed within numerous specialized contexts [17]-[21][26][28]. However, it will be appreciated that the method equally applies arbitrary variants or combinations of such DNNs, as well as to new DNNs.

Taking such a DNN, the method of the present embodiment provides pruning and complexity-accuracy scaling to optimize the DNN. The DNN may for example be implemented via any commonly-used library such as TensorFlow, caffe2, etc. Using the method, when a core DNN design like Inception or VGG-16 is fine-tuned for a specific dataset and problem context (e.g. training for IoVF SR as in the above embodiment, but also face recognition, ethnicity/gender recognition, etc.), the method can be used to also add resource-precision scaling.

The method is now described in detail with reference to FIG. 11.

In a first step 100, the initial DNN to be optimized is obtained. The DNN will comprise (artificial) neurons in layers, and filters within the layers. The following aspects of the method are then performed.

T1.1) Adaptive Filter Pruning

Figure 9:
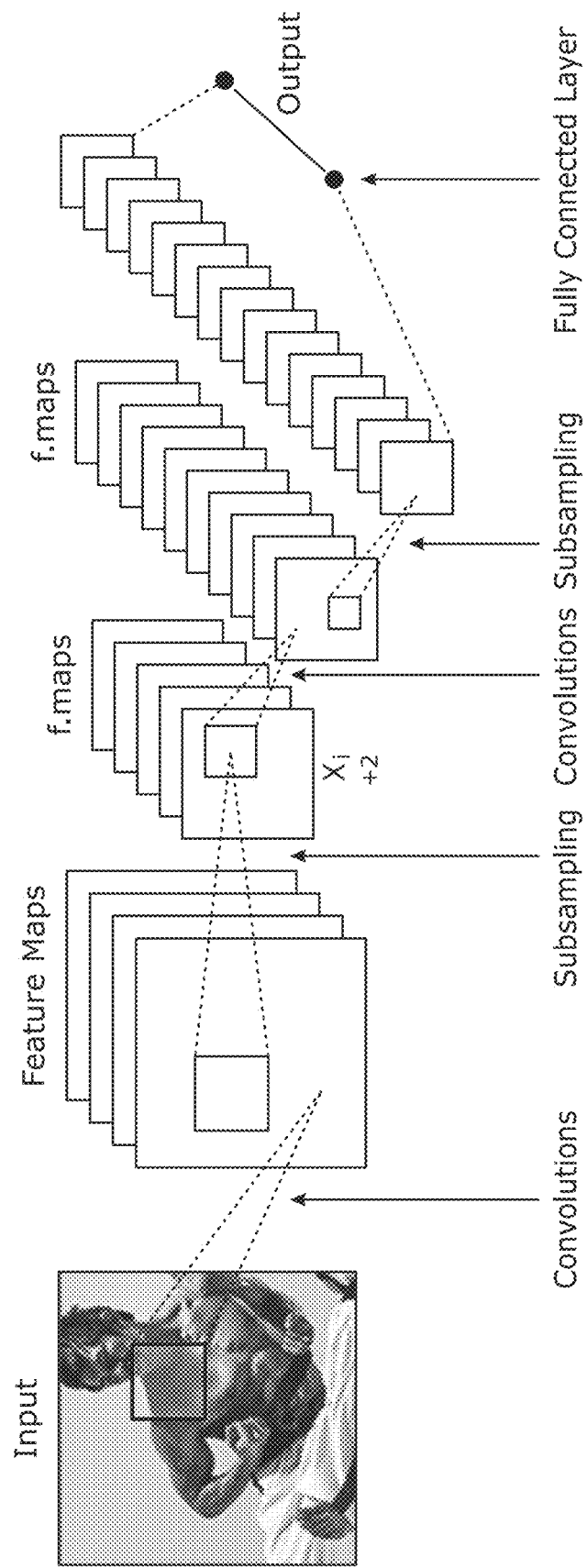
FIG. 9 is a schematic diagram of an example convolutional neural network used in image processing.

The filters are pruned to maximize computational efficiency while minimizing the drop in predictive accuracy of the neural network. For each convolutional layer i, the relative importance of each filter $F_i$ inside the layer can be calculated using the sum of its absolute weights $\Sigma_{\forall j}|F_{i,j}|$, with $F_{i,j}$ the weights of feature map $F_i$ at position j. Visual examples of feature maps are shown in FIG. 9. Other metrics of importance can be used that go beyond this weighting method, such as sum of squares or other non-linear functions of importance such as harmonic or exponential weighting of the feature map weights. The rationale in using such metrics of importance is that smaller kernel weights will produce feature maps with weak activations, which, when deactivated and removed, should not alter the accuracy of the DNN output in a significant way.

The steps for pruning M filters from the ith convolutional layer are as follows:

(i) For each DNN layer, loop through all feature maps.

(ii) For each filter $F_{i,j}$ in convolutional layer i, evaluate the importance of neurons (i.e., weights) (step 101 of FIG. 11); this can be done by calculating the sum of its absolute kernel weights $s_i = \Sigma_{\forall j} |F_{i,j}|$, or using some other form of importance measure, such as, but not limited to, sum of squares, or product of squares or absolute values, calculation of entropy of $F_{i,j}$ (or other variants of information quantification measure), etc.

(iii) Sort $s_i$ in descending order.

Figure 11:
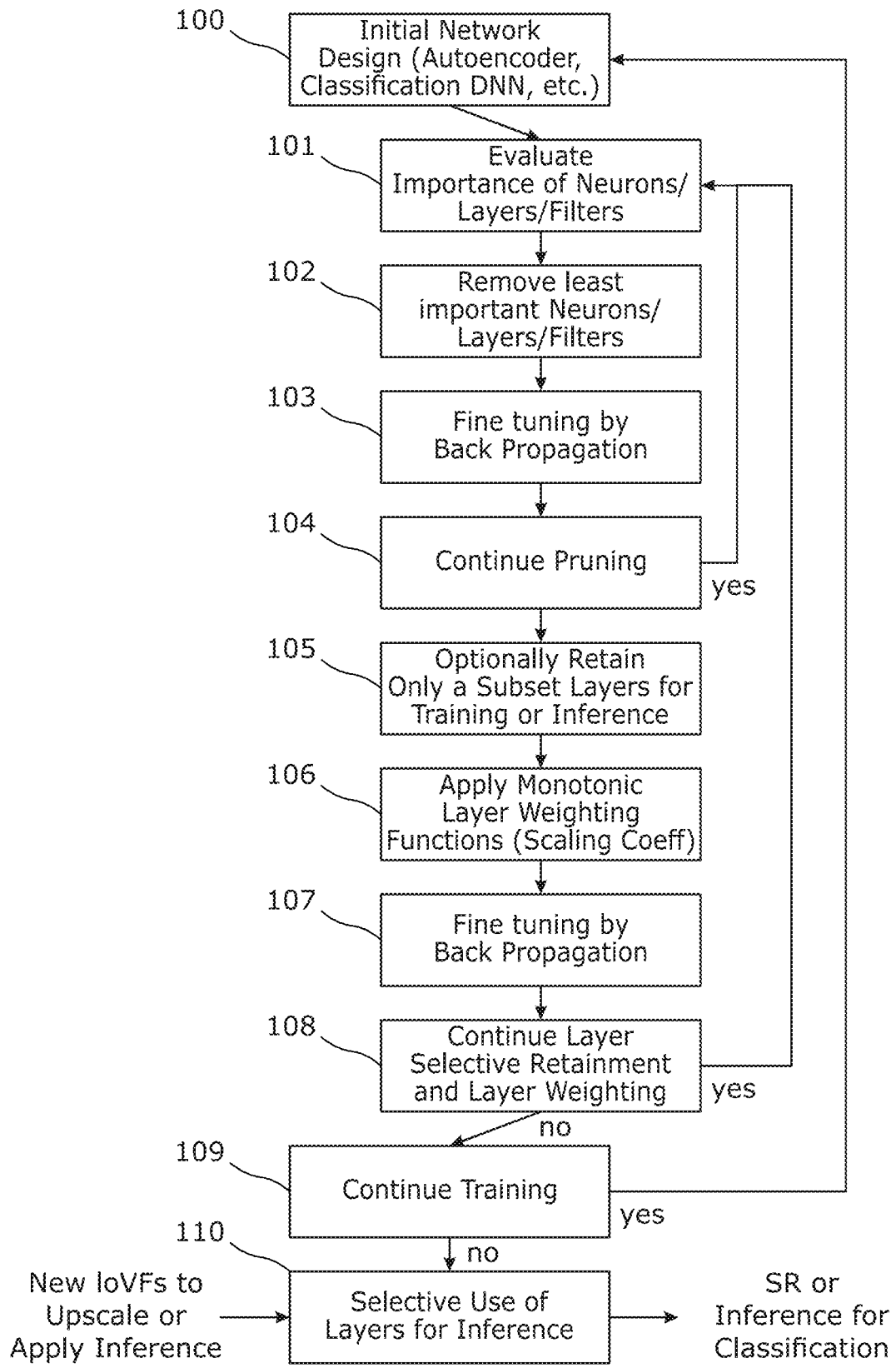
FIG. 11 is a flowchart showing the steps of a method of optimizing a neural network in accordance with an embodiment of the invention.

(iv) Prune filters with smallest $s_i$ and remove kernels in the convolutional layer i corresponding to the pruned feature maps, which (step 102 of FIG. 11).

(v) Calculate sensitivity to pruning filters for the new kernel matrix for each layer independently by evaluating the resulting pruned network's accuracy on the validation set.

(vi) Create new kernel matrix by copying the remaining kernel weights.

(vii) Retrain the network to compensate for performance degradation (step 103). Retraining can be performed after every single pruning action, after pruning all layers first or anything in between until the original accuracy is restored (the "yes" path of step 104). The remaining steps of the method (the "no" path of step 104 and beyond) are described later below.

Figure 10:
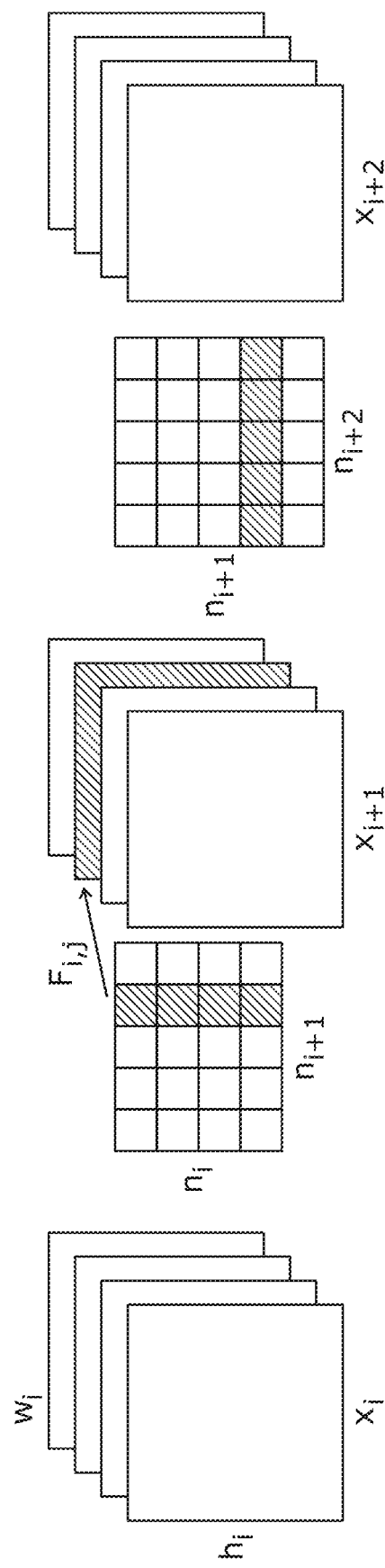
FIG. 10 is a schematic diagram showing an example of filter pruning of a neural network in accordance with an embodiment of the invention.

An example of the result of filter pruning is shown schematically in FIG. 10, showing the removal of the corresponding feature map and related kernels in the next layer.

T1.2) Adaptive Scaling in DNNs

Figure 15:
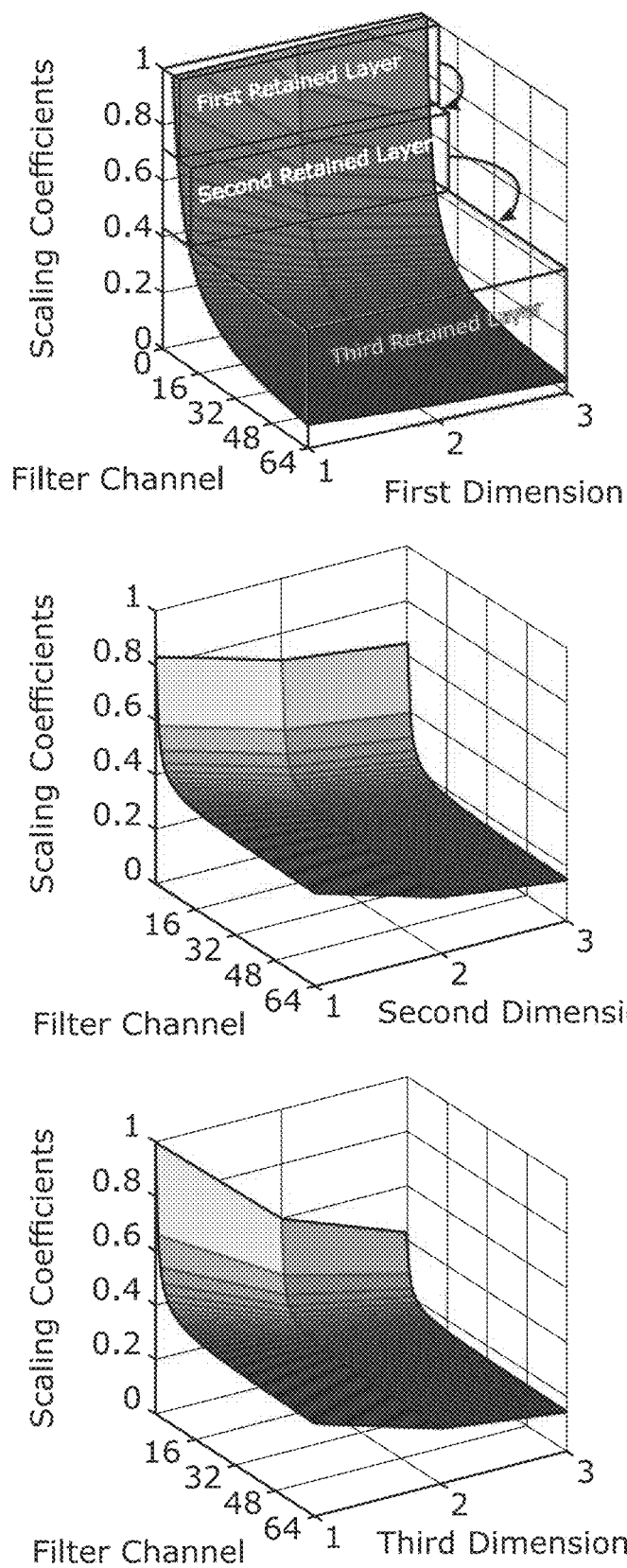
FIG. 15 shows examples of scaling coefficients for a 3×3 neural network layer across its 64 channels.

State-of-the-art deep learning libraries use dataflow graphs to define and run multilayer DNN models. Dataflow graphs explicitly define the linear and non-linear processes of a neural network for every layer, giving libraries like TensorFlow the ability to calculate differentials at every level for every node. Efficient calculation of differentials at every level is important to minimize loss functions. For example, a TensorFlow call corresponding to 64 channels of a convolutional layer (with each channel comprising a 3×3 filter that is applied with stride (per dimension) [1, 2]) is: con1=Conv(data, [3,3,64], [1,2], bias=0.0, stddev=5e-2, padding='SAME', name='conv1');

Such calls are mapped to the corresponding C++ code segments (or directly to custom hardware designs that supports TensorFlow) that carry out the data and weight reordering for the actual convolutions and update the filter weights based on the utilized stochastic gradient descent. After the pruning process of T1.1 has been applied, or independent of said pruning process, a-priori scaling with a scaling coefficient matrix that allows for inherent prioritization according to the utilized coefficients is added. For example, in the above conv1 example, a-priori 3×3×64 scaling could be performed following a set of monotonic functions that prioritized within the 64 filters of the convolutional layer, as well as within the 3×3 masks. The specific shape of these monotonic functions could be fixed, or determined based on a learning framework. An example instantiation of the learned coefficients corresponding to the conv1 layer is shown in FIG. 15. However, it will be appreciated that this represents only an example instantiation, and many other functions could be derived, such as exponential decay, hyperbolic functions, polynomial functions, etc. Due to the inherent prioritization imposed by these scaling coefficients, maintaining all the weights during the forward pass (and the backpropagation pass during training) corresponds to the least-efficient, "full-accuracy", mode (i.e. the accuracy obtained using the entire cony layer). Adaptive, highly-efficient, "lossy", modes are derived by simply retaining only small parts of the cony layer that are multiplied with largest scaling coefficients during training or inference, and ignoring the remainder parts, as in the example shown in the leftmost part of FIG. 15. Decreasing the retained part of each layer decreases the DNN accuracy. However, it can also lead to 8-128 times less data transfers, processing cycles & energy consumption due to the incurred compaction.

Furthermore, in order to provision for incremental DNN training, training can be provided with subsets of the DNN weights, starting from those corresponding to the most significant scaling coefficients, and progressing to those corresponding to the least significant coefficients. Once the DNN weights have converged for a given scaling region, they can be kept constant in order to apply during the forward pass and train subsequent regions. An example (out of many possible) of three retained layers is shown in the leftmost part of FIG. 15. Retaining only some of these coefficient layers allows for complexity scaling during training and quickly exposes the convergence rate and accuracy characteristics of a DNN design prior to extending the training to more layers. This is a crucial aspect when attempting to customize a number of DNN designs for a given dataset and machine learning context, as headway can be made in the correct direction more quickly, allowing more time to be allocated to full DNN training for the subset of the designs that were deemed appropriate to the data and learning problem at hand. In order to control the scaling properties of the final solution, the shape and size of the retained layers can also be tunable by a user, as such parameters can be exposed as a hyperparameter set within the utilized DNN library.

Next, the following steps are performed:

(viii) Optionally retain only a subset of DNN layers (step 105).

(ix) Apply monotonic layer weighting functions to the retained layers (step 106).

(x) Retrain the network to compensate for performance degradation (step 107). Retraining can be performed after every single layer selection and weighting action, after weighting all layers first, or anything in between until the original accuracy is restored (the "yes" path of step 108).

(xi) Once training is stopped in selective retainment and layer weighting (the "no" path of step 108), optionally restart the whole process (the "yes" option of step 109), or alternatively move to the inference step (step 110, following the "no" option of step 109) using new IoVFs or inputs not seen during training and selectively using layers to implement SR or classification inference on the new data.

Figure 12:
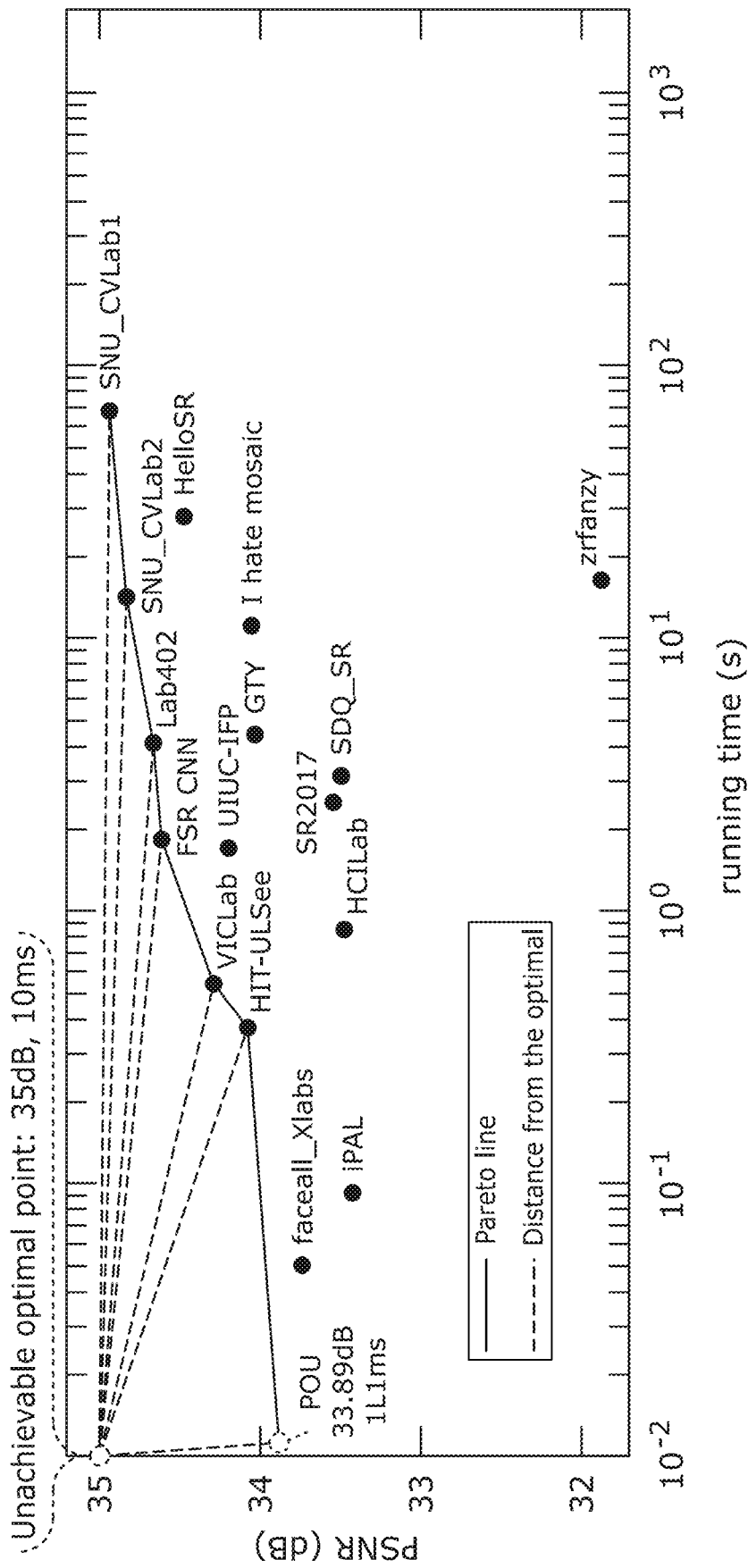

An example embodiment of layer weighting within Tensorflow [27] is now given. It will be appreciated that the invention is not limited to this embodiment. As this scaling can be implemented with a Hadamard product, e.g., a tf.mul( )command and broadcasting in NumPy prior to the cony command in TensorFlow, basic integration of such a framework within state-of-the-art DNN libraries requires no change in their codebase. Instead, it can be achieved by automated parsing of the Python layer of a TensorFlow DNN design (similar for caffe2 and elsewhere) and appropriate instrumentation. In order for the auto-differentiation and gradient flow processes of such libraries to leave the scaling coefficients unchanged, they can be defined as constants or hyperparameters, and the shape parameters of the multidimensional monotonic layering functions of FIG. 15 can be established with external optimization tools. Finally, since the proposed layering is applied as a preprocessing layer (and potentially as a backprop postprocessing layer as discussed in the next task), other optimizations like adaptive DNN weight quantization or BinaryNets [23]-[25][39][41] can be applied for system-specific acceleration. Importantly, the disclosed invention is not limited to a specific implementation library like Tensorflow or caffe, and can also be implemented in bespoke hardware processors and any programmable interface that can support DNN operations. Example accuracy-performance SR results with example embodiments of the disclosed pruning, projection operations and approximations for convolution and matrix product operations are shown in FIGS. 12 to 14.

T1.3) Optimization and Control of Scaling Coefficient Functions

The described graceful degradation in accuracy for resource scaling and DNN layer compaction depends on the choice of the framework to design the shape of the monotonic scaling functions of each layer. Starting from a variety of initializations, e.g., using linearly-, polynomially- or exponentially-decaying functions, adjustment of the shape parameters of the functions within the backpropagation operation carried out within each layer is performed. As a non-limiting example, based on the average differential carried across each dimension of the layering coefficients of FIG. 15, a corresponding increase of decrease of the linear, polynomial or the exponential decay constants (and biases) is applied in order to adjust the shape of the utilized scaling functions according to the strength, homogeneity (and direction) of the gradient flow.

Figure 3:
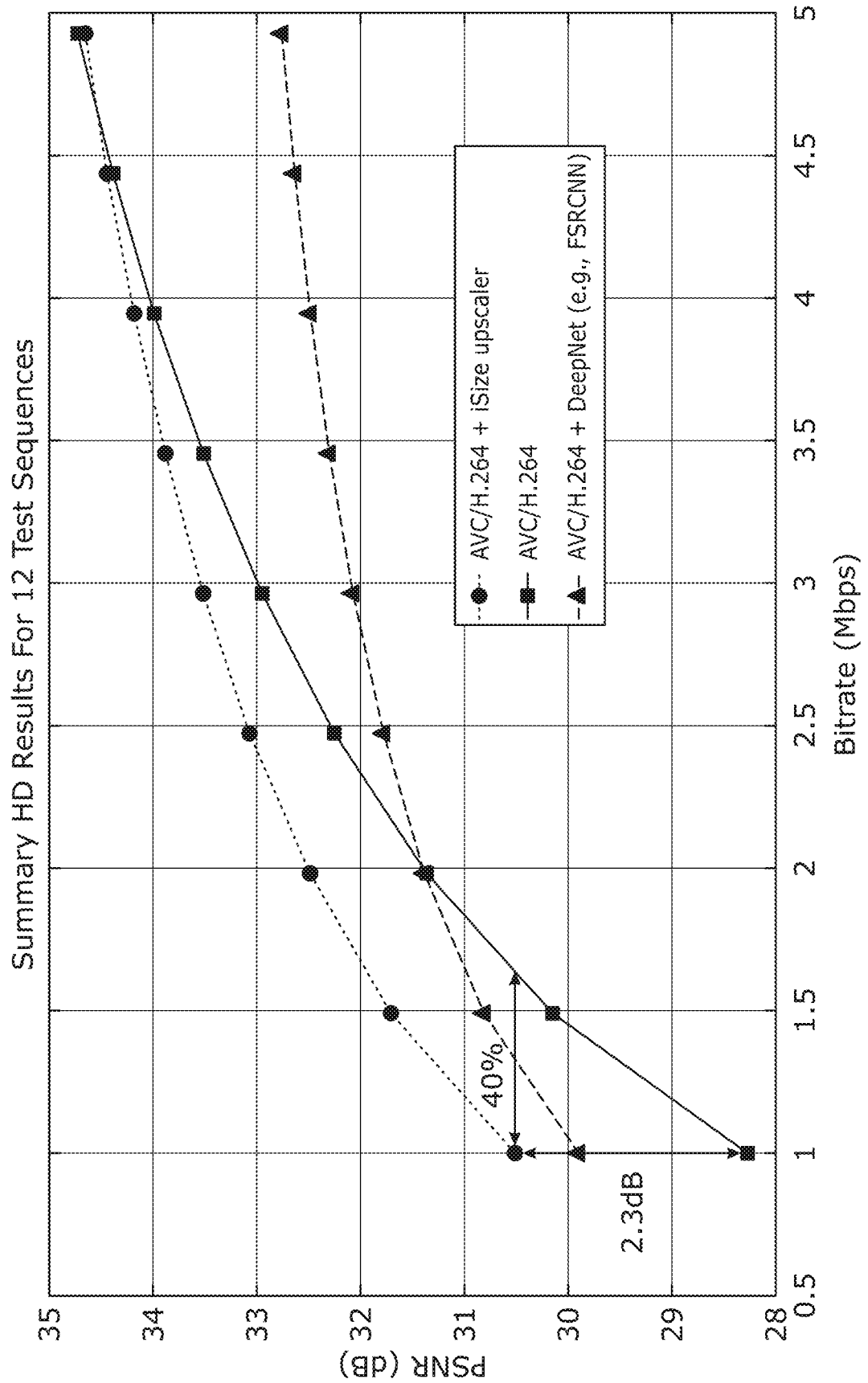
FIGS. 3 and 4 show comparison bitrate-PSNR results for video sequences encoded and decoded by methods in accordance with embodiments of the invention, and known methods.
Figure 4:
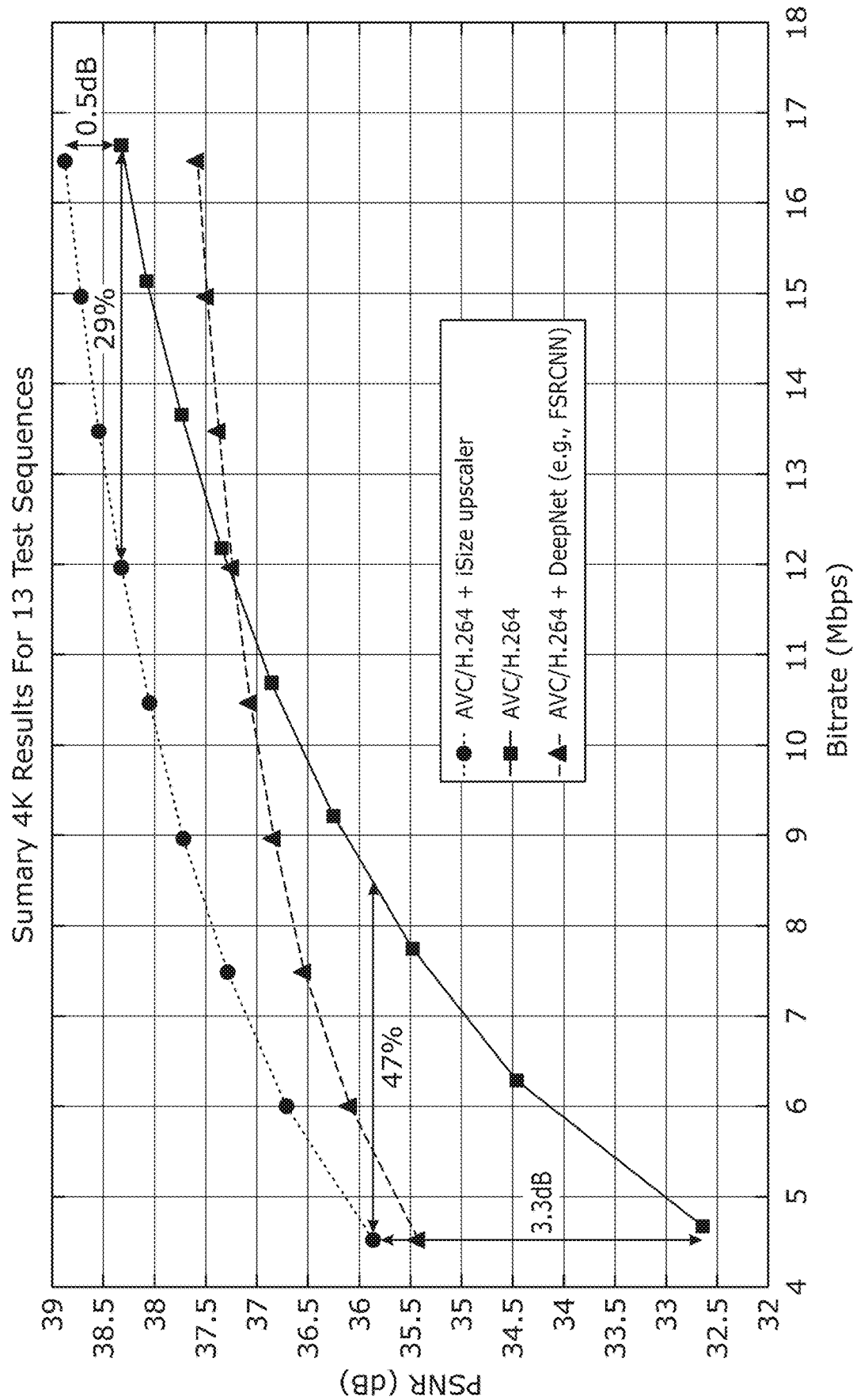

Example bitrate-PSNR curves obtained from embodiments of the invention include, but are not limited to, those presented in FIGS. 3 and 4. These utilize settings: a=1, b=2, the blur kernel of eq. 3, the adaptive filtering process of eq. 1, three iterations of the iteration process of FIG. 5, and the MPEG/ITU-T H.264/AVC video codec as embodied by the open-source FFmpeg libx264 library. The horizontal and vertical black arrows indicate example bitrate reduction or PSNR increase offered by the example embodiments of the disclosed invention over the conventional video codec that only performs the encoding stage 3 and decoding stage 5.

Figure 16:
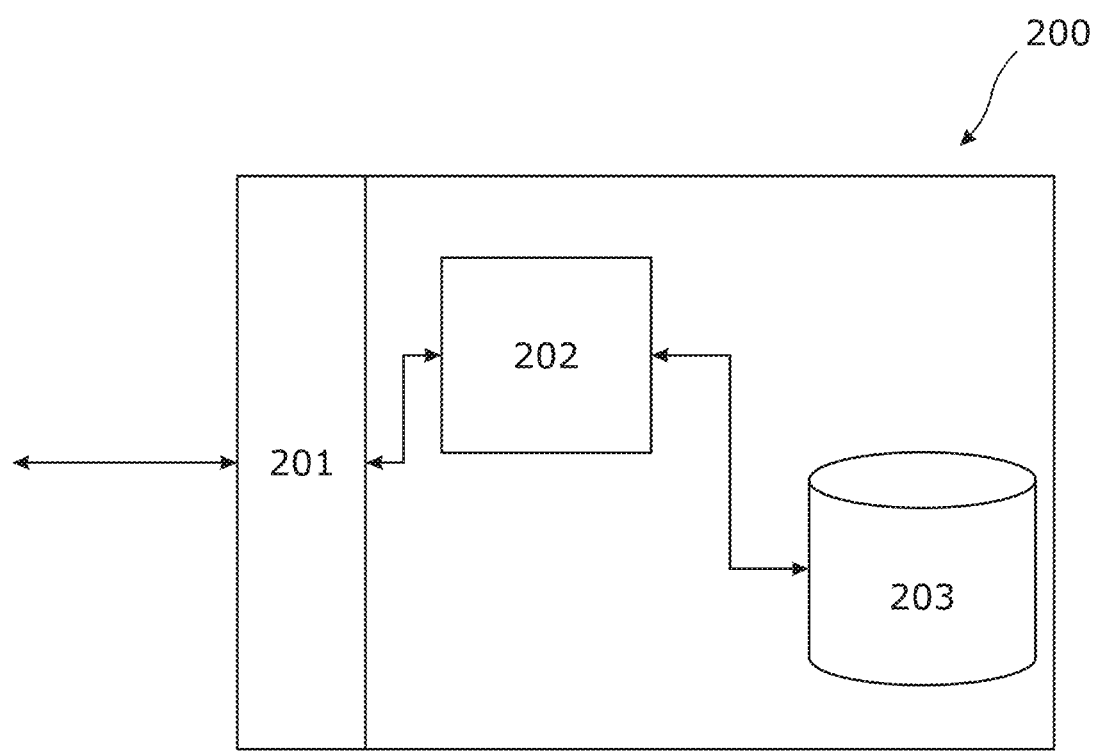
FIG. 16 is a schematic diagram of a computing device in accordance with an embodiment of the invention.

Embodiments of the invention include the methods described above performed on a computing device, such as the computing device shown in FIG. 16. The computing device 200 comprises a data interface 201, through which data can be sent or received, for example over a network. The computing device 200 further comprises a processor 202 in communication with the data interface 201, and memory 203 in communication with the processor 202. In this way, the computing device 200 can receive data, such as image data or video data, via the data interface 201, and the processor 202 can store the received data in the memory 203, and process it so as to perform the methods of embodiments the invention, including encoding image data, decoding encoded image data, and optimizing an artificial neural network.

While the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

REFERENCES

[1] Dong, Jie, and Yan Ye. "Adaptive downsampling for high-definition video coding." IEEE Transactions on Circuits and Systems for Video Technology 24.3 (2014): 480-488.

[2] Douma, Peter, and Motoyuki Koike. "Method and apparatus for video upscaling." U.S. Pat. No. 8,165,197. 24 Apr. 2012.

[3] Su, Guan-Ming, et al. "Guided image up-sampling in video coding." U.S. Pat. No. 9,100,660. 4 Aug. 2015.

[4] Shen, Minmin, Ping Xue, and Ci Wang. "Downsampling based video coding using super-resolution technique." *IEEE Transactions on Circuits and Systems for Video Technology* 21.6 (2011): 755-765.

[5] van der Schaar, Mihaela, and Mahesh Balakrishnan. "Spatial scalability for fine granular video encoding." U.S. Pat. No. 6,836,512. 28 Dec. 2004.

[6] Boyce, Jill, et al. "Techniques for layered video encoding and decoding." U.S. patent application Ser. No. 13/738,138.

[7] Dar, Yehuda, and Alfred M. Bruckstein. "Improving low bit-rate video coding using spatio-temporal down-scaling." *arXiv preprint arXiv:* 1404.4026 (2014).

[8] Martemyanov, Alexey, et al. "Real-time video coding/decoding." U.S. Pat. No. 7,336,720. 26 Feb. 2008.

[9] Nguyen, Viet-Anh, Yap-Peng Tan, and Weisi Lin. "Adaptive downsampling/upsampling for better video compression at low bit rate." *Circuits and Systems*, 2008. ISCAS 2008. *IEEE International Symposium on*. IEEE, 2008.

[10] Hinton, Geoffrey E., and Ruslan R. Salakhutdinov. "Reducing the dimensionality of data with neural networks." science313.5786 (2006): 504-507.

[11] van den Oord, Aaron, et al. "Conditional image generation with pixelcnn decoders." *Advances in Neural Information Processing Systems*. 2016.

[12] Theis, Lucas, et al. "Lossy image compression with compressive autoencoders." *arXiv preprint arXiv:* 1703.00395(2017).

[13] Wu, Chao-Yuan, Nayan Singhal, and Philipp Krähenbühl. "Video Compression through Image Interpolation." *arXiv preprint arXiv:* 1804.06919 (2018).

[14] Rippel, Oren, and Lubomir Bourdev. "Real-time adaptive image compression." *arXiv preprint arXiv:* 1705.05823 (2017).

[15] Golub, Gene H., and Charles F. Van Loan. *Matrix computations*. Vol. 3. JHU Press, 2012.

[16] R. Timofte, et al., "NTIRE 2017 challenge on single image super-resolution: Methods and results," Proc. Comp. Vis. and Pattern Recognition Workshops (CVPRW), 2017 IEEE Conf. on Comp. Vis. and Pattern Recognition, CVPR, IEEE, 2017, https://goo.gl/TQRT7E.

[17] B. Lim, et al. "Enhanced deep residual networks for single image super-resolution," Proc. Comp. Vis. and Pattern Recognition Workshops (CVPRW), 2017 IEEE Conf. on Comp. Vis. and Pattern Recogn., CVPR, IEEE, 2017, https://goo.gl/PDSTiV.

[18] C. Dong, et al., "Accelerating the super-resolution convolutional neural network," Proc. 2016 IEEE Conf. on Comp. Vis. and Pattern Recognition, CVPR, IEEE, 2016, https://goo.gl/Qa1UmX.Dong, Jie, and Yan Ye. "Adaptive downsampling for high-definition video coding." IEEE Transactions on Circuits and Systems for Video Technology 24.3 (2014): 480-488.

[19] Dong, C., Loy, C. C., He, K., Tang, X, "Learning a deep convolutional network for image super-resolution," Proc. ECCV (2014) 184-199

[20] Dong, C., Loy, C. C., He, K., Tang, X, "Image super-resolution using deep convolutional networks," IEEE TPAMI 38(2) (2015) 295-307

[21] Yang, C. Y., Yang, M. H., "Fast direct super-resolution by simple functions," Proc. ICCV. (2013) 561-568

[22] Dong, C., Loy, C., Tang, X.: Accelerating the Super-Resolution Convolutional Neural Network, Proc. ICCV (2016).

[23] Han, Song, Huizi Mao, and William J. Dally, "Deep compression: Compressing deep neural networks with pruning, trained quantization and huffman coding," arXiv preprint arXiv: 1510.00149 (2015).

[24] Han, Song, et al., "Learning both weights and connections for efficient neural network," Advances in neural information processing systems. 2015.

[25] Iandola, Forrest N., et al., "SqueezeNet: AlexNet-level accuracy with 50x fewer parameters and <0.5 MB model size," arXiv preprint arXiv:1602.07360 (2016)

[26] Y. LeCun, Y. Bengio, and G. Hinton, "Deep learning," Nature, vol. 521, no. 7553, 2015.

[27] M. Abadi, "TensorFlow: A system for large-scale machine learning," Proc. 12th USENIX Symp. on Oper. Syst. Des. and Implem. (OSDI), Savannah, Ga., USA. 2016.

[28] K. Simonyan and A. Zisserman, "Two-stream convolutional networks for action recognition in videos," Proc. Advances in Neural Inf. Process. Syst., NIPS, 2014.

[29] V. Sze, et al., "Hardware for machine learning: Challenges and opportunities," arXiv preprint, arXiv: 1612.07625, 2016.

[30] C. Zhang, et al., "Optimizing FPGA-based accelerator design for deep convolutional neural networks," Proc. ACM/SIGDA Int. Symp. Field-Prog. Gate Arr., FPGA. ACM, 2015.

[31] T. Chen, et al., "DianNao: A small-footprint high-throughput accelerator for ubiquitous machine-learning," Proc. ASPLOS, 2014.

[32] A. Shafiee, "ISAAC: A convolutional neural network accelerator with in-situ analog arithmetic in crossbars," Proc. IEEE Int. Symp. on Comp. Archit., ISCA, 2016.

[33] L. Chi, et al., "PRIME: A novel processing-in-memory architecture for neural network computation in ReRAM-based main memory," Proc. IEEE Int. Symp. on Comp. Archit., ISCA, 2016.

[34] B. Park, et al., "A 1.93TOPS/W scalable deep learning/inference processor with tetra-parallel MIMD architecture for big-data applications," Proc. ISSCC, 2015.

[35] A. Cavigelli, et al., "Origami: A convolutional network accelerator," Proc. GLVLSI, 2015.

[36] H. Mathieu, et al., "Fast training of convolutional networks through FFTs," Proc. ICLR, 2014.

[37] C. Yang, et al., "Designing energy-efficient convolutional neural networks using energy-aware pruning," arXiv preprint arXiv:1611.05128, 2016.

[38] J. Hsu, "For sale: deep learning," IEEE Spectrum, vol. 53, no. 8, pp. 12-13, August 2016.

[39] M. Han, et al., "Deep compression: Compressing deep neural network with pruning, trained quantization and Huffman coding," Proc. ICLR, 2016.

[40] K. Chen, "Eyeriss: An energy-efficient reconfigurable accelerator for deep convolutional neural networks," Proc. ISSCC, 2016.

[41] M. Courbariaux, and Y. Bengio, "Binarynet: Training deep neural networks with weights and activations constrained to +1 or −1," arXiv preprint, arXiv:1602.02830, 2016.

What is claimed is:

1. A computer-implemented method of encoding image data for one or more images using an image codec, wherein the image codec comprises a downscaling process, the method comprising the steps of:
  downscaling the one or more images in accordance with the initial downscaling process, using an artificial neural network comprising a plurality of layers of neurons;
  subsequently encoding the one or more downscaled images using the image codec; and
  iterating, until a stopping condition is reached, the steps of:
    determining an importance value for a set of neurons or layers of neurons;
    removing the neurons and/or layers with importance value less than a determined amount from the neural network; and
    tuning the neural network in accordance with a cost function, wherein the cost function is arranged to determine a redetermined balance between the accuracy of the downscaling performed by neural network and the complexity of the neural network;
  applying a monotonic scaling function to the weighting of the neurons of the neural network; and
  tuning the neural network.

2. The method of claim 1, wherein the one or more images are downscaled using one or more filters.

3. The method of claim 2, wherein a filter of the one or more filters is an edge-detection filter.

4. The method of claim 2, wherein a filter of the one or more filters is a blur filter.

5. The method of claim 2, wherein the parameters of a filter used to downscale an image are determined using the results of the encoding of previous images by the image codec.

6. The method of claim 1, wherein in the removal step, the layer with lowest importance value is removed.

7. The method of claim 1, wherein the stopping condition is that the iterated steps have been performed a predetermined number of times.

8. The method of claim 1, wherein the iterated steps and the applying and tuning steps are iterated until a further stopping condition is reached.

9. The method of claim 1, wherein the step of downscaling the one or more images comprises the step of determining the processes to use to downscale an image using the results of the encoding of previous images by the image codec.

10. The method of claim 1, wherein the encoded image data comprises data indicative of the downscaling performed.

11. The method of claim 1, wherein the image codec is lossy.

12. A computer-implemented method of decoding encoded image data for one or more images, wherein the encoded image data was encoded using a method of encoding image data for one or more images using an image codec, wherein the image codec comprises a downscaling process, the method of encoding image data comprising the steps of:
- downscaling the one or more images in accordance with the initial downscaling process using an artificial neural network comprising a plurality of layers of neurons; and
- subsequently encoding the one or more downscaled images using the image codec;
- iterating, until a stopping condition is reached, the steps of:
  - determining an importance value for a set of neurons or layers of neurons;
  - removing the neurons and/or layers with importance value less than a determined amount from the neural network; and
  - tuning the neural network in accordance with a cost function, wherein the cost function is arranged to determine a predetermined balance between the accuracy of the downscaling performed by neural network and the complexity of the neural network;
- applying a monotonic scaling function to the weighting of the neurons of the neural network; and
- tuning the neural network,
- wherein the method of decoding encoded image data comprising the steps of:
  - decoding the encoded image data using the image codec to generate one or more downscaled images; and
  - upscaling the one or more images.

13. The method of claim 12, wherein the encoded image data comprises data indicative of the downscaling performed, and the data indicative of the downscaling performed is used when upscaling the one or more images.

14. The method of claim 1, wherein the image data is video data, the one or more images are frames of video, and the image codec is a video codec.

15. A computing device comprising:
- a processor; and
- a memory,
- wherein the computing device is arranged to perform using the processor a method of encoding image data for one or more images using an image codec, wherein the image codec comprises a downscaling process, the method comprising the steps of:
  - downscaling the one or more images in accordance with the initial downscaling process using an artificial neural network comprising a plurality of layers of neurons;
  - subsequently encoding the one or more downscaled images using the image codec; and
  - iterating, until a stopping condition is reached, the steps of:
    - determining an importance value for a set of neurons or layers of neurons;
    - removing the neurons and/or layers with importance value less than a determined amount from the neural network; and
    - tuning the neural network in accordance with a cost function, wherein the cost function is arranged to determine a predetermined balance between the accuracy of the downscaling performed by neural network and the complexity of the neural network;
  - applying a monotonic scaling function to the weighting of the neurons of the neural network; and
  - tuning the neural network.

16. A non-transitory computer-readable medium comprising instructions that, when executed by a processor of a computing device, cause the computing device to perform a method of encoding image data for one or more images using an image codec, wherein the image codec comprises a downscaling process, the method comprising the steps of:
- downscaling the one or more images in accordance with the initial downscaling process using an artificial neural network comprising a plurality of layers of neurons;
- subsequently encoding the one or more downscaled images using the image codec; and
- iterating, until a stopping condition is reached, the steps of:
  - determining an importance value for a set of neurons or layers of neurons;
  - removing the neurons and/or layers with importance value less than a determined amount from the neural network; and
  - tuning the neural network in accordance with a cost function, wherein the cost function is arranged to determine a predetermined balance between the accuracy of the downscaling performed by neural network and the complexity of the neural network;
- applying a monotonic scaling function to the weighting of the neurons of the neural network; and
- tuning the neural network.

* * * * *